SINEWAVE OSCILLATOR WITH AUTOMATIC FREQUENCY CONTROL

Filed June 26, 1964

INVENTORS
HAROLD P. BRUCE
RICHARD W. BRADMILLER
BY Michael A. Sileo Jr.
ATTORNEY United States Patent Office 3,303,435
Patented Feb. 7, 1967

3,303,435

SINEWAVE OSCILLATOR WITH AUTOMATIC FREQUENCY CONTROL

Richard W. Bradmiller and Harold P. Bruce, Orange County, Fla., assignors to Martin-Marietta Corporation, Middle River, Md., a corporation of Maryland Filed June 26, 1964, Ser. No. 378,149
8 Claims. (Cl. 331—113)

This invention relates to frequency stable oscillators, and more particularly to a transistorized, frequency stable, free running sinusoidal waveform generator advantageously capable of producing a highly stable frequency and which uniquely includes a capability of automatically changing the frequency of the generator by remotely applied D.C. control voltages so as to compensate for any undesirable frequency drifts due to any voltage or temperature variations.

In many communication and command intelligence systems, low frequencies are utilized, and to this extent highly reliable and stable low frequency generating equipment is required. Generally, such low frequency systems utilize low frequency oscillators at the receiving portion of the system and usually provide an automatic frequency control circuit for establishing the frequency of these oscillators. Automatic frequency control of the systems frequency oscillators is a highly desirable and often times an essential feature for providing rapid synchronization of the oscillator's frequency with respect to the frequency of the incoming signals thereby advantageously providing a capability for simultaneous or synchronous detection.

In more recently developed random access discrete address communication systems, such as the type described in patent application Serial No. 107,194 filed May 2, 1961, now Patent No. 3,239,761, in the name of McKay Goode, which is assigned to the assignee of the instant application, there exists a requirement for a subcarrier or clock sampling frequency in the neighborhood of 8–10 kc. The subcarrier or clock frequency generator of these systems must be highly stable in order to achieve accurate demodulation of the incoming position modulated pulses. In this respect, it has been a common practice in some of these systems to utilize narrow band networks, such as crystal controlled, tuned L-C or tuned R-C type circuits to generate a relatively stable clock frequency.

In crystal controlled circuits, it is possible, with critically designed circuitry, of course, to achieve stabilities of approximately 50 parts per million per degree centigrade (p.p.m./° C.), whereas intuned L-C or tuned R-C circuits, stabilities of approximately 1000 p.p.m./° C. are attainable. In all of these prior known narrow band networks, it is most difficult, and in most circumstances highly impractical, to include a capability of automatically changing the frequency of the network by remotely applied control voltages (AFC). Further, in both the prior known crystal controlled circuits and the prior known narrow band networks, although acceptable frequency stability is possible these circuits are basically insensitive to control voltages and have, in addition, relatively long response times to D.C. control signals. Such frequency stability is mandatory when the oscillator is to be used in a random access discrete address communication system. One example, however, of a recently patented narrow band oscillator having a reasonably stable frequency output, is set forth in U.S. Letters Patent No. 3,070,757, issued December 26, 1962, in the name of A. E. Plogstedt and R. W. Bradmiller, the latter patentee being a co-inventor of the present invention.

The foregoing deficiencies of prior art narrow band networks are uniquely eliminated by the novel transistorized, frequency stable, free running sinewave oscillator of the present invention.

In accordance with the present invention a 2 stage, transistorized oscillator is utilized to generate a stabilized low frequency sinewave. This novel sinewave oscillator develops a relatively stable frequency with circuit means considerably less complex than that required in prior known multistage sinewave oscillators. Briefly, this novel oscillator comprises in effect two alternatively conducting active devices, cross-connected so as to provide both a D.C. forward loop and a D.C. degenerative feedback loop. In addition, an A.C. regenerative feedback loop is provided which includes reactive timing means, such as a series L-C network for discharging the emitting elements of the active devices, and for restoring such emitting elements of the active devices to their active bias region, thereby modifying the conductive states of the active devices in a repetitious inverse manner with respect to each other. This modification of the conductive states of the active devices is controlled by the L-C time constant of the L-C network thereby producing the desired repetitious change in current conduction, and consequently establishing the desired oscillator frequency. That is to say, the D.C. forward loop, in conjunction with the D.C. regenerative feedback loop, prevents the active devices from simultaneously being in the same conductive state, or permits only one of such active devices to be driven toward its high conductive state during any half-cycle of operation; whereas, the reactive means in the A.C. regenerative loop restores the emitting elements of the active devices to their active bias region, thereby driving one device toward its low conductive state. When the reactive means in the A.C. regenerative feedback loop restores the emitting elements to their active bias region, the active device which is in its low conductive state is driven toward its high conductive state, and in effect overrides the circuit function of the D.C. forward loop and the D.C. regenerative feedback loop. Thus, the current conducting states of the two active devices are alternated or, as is commonly stated in the art, the oscillator "reverses" its current conducting state during a time period dependent upon the time constant of the L-C network.

It should be noted here that the capacitance in the reactive means with respect to the inductance in the reactance means causes one of the active devices to reach a current saturation point, whereby such one active device commences to "reverse" its current conducting state. The capacitance and inductance of the reactive means can be varied with respect to each other so as to change the time period at which current saturation of the active devices occurs.

In addition to the foregoing advantageous features, the low frequency oscillator of the present invention desirably permits the use of D.C. control voltages in an AFC circuit, thereby automatically adjusting the oscillator's frequency and dynamically compensating for any undesirable drifts of the oscillator's frequency commonly caused, for example, by voltage and/or temperature variations. In this connection, it is interesting to note that the changes in frequency caused by this AFC circuit are uniquely linear with respect to the D.C. control voltage applied to the oscillator. That is to say, with each unit change in the D.C. control voltage of the AFC circuit there advantageously occurs a unit change in the oscillator frequency which is linear with respect to the unit change in the D.C. control voltage.

The novel oscillator of the present invention also has a relatively wide frequency control range and consequently is not significantly rate limited in response to external D.C. synchronizing information, and because of these features and advantages, it is well suited for use in the aforementioned communication system of McKay Goode, or in other similar type communication systems.

It is accordingly a primary object of the present invention to provide a transistorized, frequency stable, free running oscillator capable of operating under extreme ranges of environmental conditions.

Another object of the present invention is to provide an oscillator of the type described which further includes a capability of automatically changing the frequency of the oscillator by remotely applied D.C. control voltages.

Another object of the present invention is to provide an oscillator of the type described which is advantageously capable of developing a highly stable clock sampling frequency for use as the clock generator in a random access discrete address communication system.

Another object of the present invention is to provide an oscillator of the type described which utilizes both a D.C. forward loop and a D.C. degenerative feedback loop in circuit combination with an A.C. regenerative feedback loop having L-C reactive timing means, whereby a D.C. control voltage in an AFC configuration can be advantageously utilized to dynamically compensate for undesirable frequency drifts caused, for example, by voltage and/or temperature variations.

Another object of the present invention is to provide an oscillator of the type described which utilizes a D.C. control voltage in an AFC circuit to dynamically compensate for undesirable frequency drifts of the oscillator's frequency, whereby a unit change in the D.C. control voltages of the AFC circuit causes a linearly proportional unit change in the oscillator's frequency.

This invention is related to our patent application Serial No. 374,020 filed June 10,1964, now Patent No. 3,268,834, and assigned to the assignee of the present application. Some of the claims of this former application are generic to the instant application.

These and further objects and advantages of the present invention will become more apparent upon reference to the following claims and the appended drawings wherein:

Figure 1:
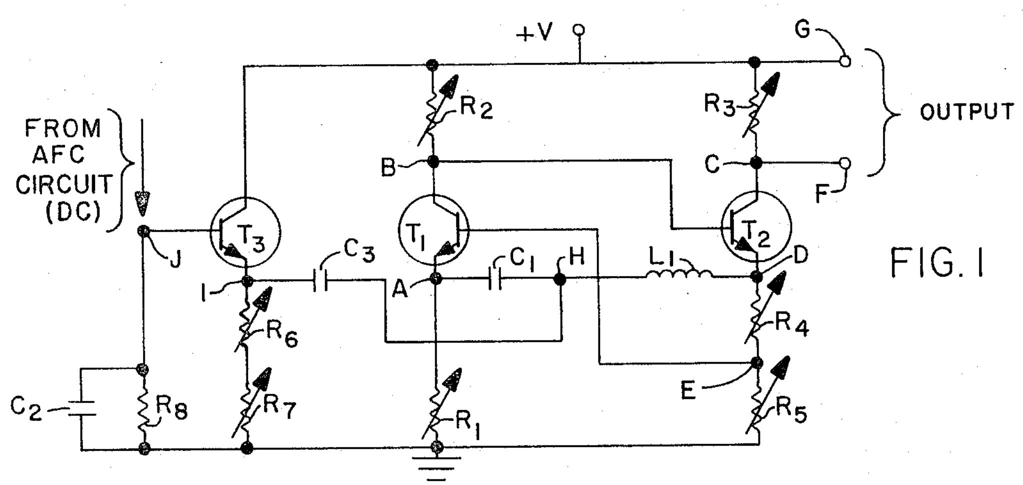
FIGURE 1 is a circuit diagram of a preferred embodiment of the sinewave oscillator in accordance with the present invention, with automatic frequency control (AFC) voltages developed by conventional AFC circuits (not shown) being applied to terminal H, through impedance matching transistor, and the output being developed across resistor $R_3$.

Referring specifically to FIG. 1, a preferred embodiment of the frequency stable oscillator is shown as comprising two transistors $T_1$ and $T_2$, each having emitter, collector and base electrodes. Transistor $T_1$ has its col lector connected to source +V via terminal B and variable resistor $R_2$, while its emitter is connected to ground via terminal A and variable resistor $R_1$; whereas, transistor $T_2$ has its collector connected to source +V via terminal C and variable resistor $R_3$, while its emitter is connected to ground via terminal D, variable resistor $R_4$, terminal E, and variable resistor $R_5$. Note here, that the value of resistors $R_1$ and $R_2$ in the emitter collector circuit of transistor $T_1$ and the value of resistors $R_3$–$R_5$ in the emitter-collector circuit of transistor $T_2$, and the cross-connection of the bases of transistors $T_1$ and $T_2$ to the resistive bias strings in the emitter-collector circuits of transistors $T_2$ and $T_1$, respectively, determines the stabilized operating bias for transistors $T_1$ and $T_2$.

Base bias for transistor $T_1$ is provided by means of a direct connection between terminal E and the base of transistor $T_1$, whereas base bias for transistor $T_2$ is provided by means of a direct connection between terminal B and the base of transistor $T_2$. As will therefore be seen, an oscillator is formed wherein the repetition rate or frequency thereof is provided by the capacitor $C_1$ and inductor $L_1$, which are series connected between terminals A and D. The sinewave generated by the frequency stable oscillator of FIG. 1 is derived across resistor $R_3$, which is connected between terminal C and source +V, and such output appears between terminals F and G.

In order to set up the oscillator of FIG. 1 for stable low frequency oscillation, the capacitor $C_1$ and inductor $L_1$ are effectively disconnected from the circuit, and the variable resistors $R_1$ to $R_5$ are adjusted for stable direct current operation. The emitter resistor $R_5$, in parallel with the series combination of resistors $R_4$ and the reflected emitter impedance of transistor $T_2$ with respect to source +V, constitutes a base driving impedance for transistor $T_1$. Accordingly, by maintaining the base driving impedance low in comparison to the base input impedance of transistor $T_1$, stable direct current operation uniquely results over a wide variation in transistor parameters.

When capacitor $C_1$ and inductor $L_1$ are effectively connected back into the circuit, the cross-coupled transistorized circuit of FIG. 1 goes into oscillation at a frequency directly determined by the values of variable resistors $R_1$ to $R_5$ and by the value of capacitor $C_1$ and inductor $L_1$, thereby deriving a stable low frequency output.

It should be noted at this point that the direct connection between terminal B and the base of transistor $T_2$ constitutes a forward loop; that the direct connection between terminal E to the base of transistor $T_1$ constitutes a degenerative or negative feedback loop and that the series connected capacitor $C_1$ and inductor $L_1$ connected between terminals A and D, which in effect is a reactive coupling between the emitters of transistors $T_1$ and $T_2$, constitutes a regenerative or positive feedback loop.

Figure 2:
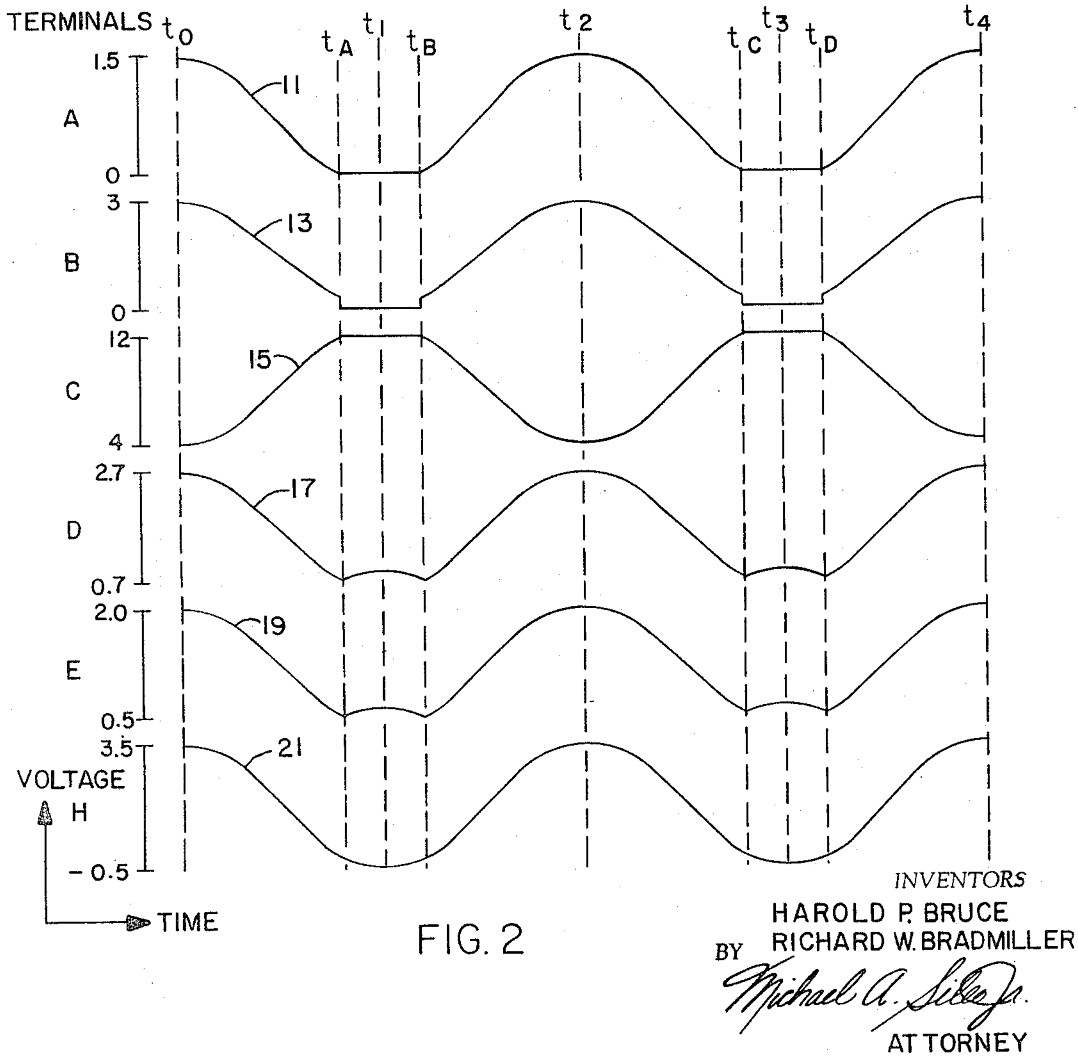
FIGURE 2 depicts waveforms present at several ap propriate terminals in the circuit of FIG. 1, with the verti cal dash lines, which represent pertinent time periods, included to assist in the detailed explanation of the circuit of FIG. 1 and its mode of operation.

The forward loop, which comprises terminal B, base-collector path of transistor $T_2$, terminal C, resistor $R_3$, source +V and resistor $R_2$, provides the base bias for transistor $T_2$. The negative feedback loop, which comprises terminal B, base-emitter path of transistor $T_2$, terminal D, resistor $R_4$, terminal E, and the base-collector path of transistor $T_1$, provides the base bias for transistor $T_1$ and insures that the oscillator of FIG. 1 will be free running. In addition, the negative feedback loop insures that the forward gain of the oscillator is equal to $$R_5+R_4/R_5$$

and that such oscillator is relatively independent of transistor parameters. The positive feedback loop, which comprises terminal A, emitter-collector path of transistor $T_1$, terminal B, base-emitter path of transistor $T_2$, terminal D, inductor $L_1$ terminal H and capacitor $C_1$, insures that the oscillator of FIG. 1 will oscillate, i.e., transistors $T_1$ and $T_2$ repetitiously "reverse" their conductivity states. This is so because the overall gain of the oscillator is equal to or greater than one for all frequencies where the reactive impedance of $X_C$ and $X_L$, which are respectively the impedance of capacitor $C_1$ and inductor $L_1$, is equal to or greater than the impedance of the emitter of transistor $T_1$. This actually determines the repetition rate of the oscillator. Note here that the charge and discharge paths for capacitor $C_1$ and $L_1$ during the time intervals $t_1$–$t_2$, $t_2$–$t_3$, $t_3$–$t_4$, etc. as shown in FIG. 2, involve all of the resistors $R_1$–$R_5$, as well as the saturated current gain and leakage of both transistors $T_1$ and $T_2$.

Note at this point that a D.C. control voltage is coupled to terminal J. This D.C. control voltage may be conventionally developed, for example, by comparing the A.C. components of the waveform appearing across terminals F and G with a standard A.C. voltage in any well known AFC circuit (not shown). This D.C. error or control voltage when applied to the oscillator via terminal J, for example, advantageously and rapidly compensates for any frequency shifts of the output sinewave from a desired and predetermined frequency.

In the circuit of FIG. 1, the D.C. control voltages for AFC purposes are coupled to terminal H via an impedance matching transistor $T_3$. Transistor $T_3$ has its collector electrode directly coupled to source +V; its base electrode coupled to ground via terminal J and the variable resistor $R_8$ which is bypassed by capacitor $C_2$; and its emitter electrode connected to ground via terminal I and the series connected variable resistors $R_6$ and $R_7$. The emitter electrode of transistor $T_3$ is also connected to terminal H, which is the junction of capacitor $C_1$ and inductor $L_1$, via terminal I and coupling capacitor $C_3$. Note here that the A.C. components of the D.C. control voltages applied to terminal J, which appear on terminal I, are coupled to terminal H via capacitor $C_3$, or, in effect, when transistor $T_3$ conducts, the capacitance in the series L–C circuit $L_1$–$C_1$ is varied in a linearly proportional manner with respect to the D.C. control voltages applied to the base electrode of transistor $T_3$. Note also that resistors $R_6$ and $R_7$ provide emitter bias for transistor $T_3$, whereas the bypassed resistor $R_8$ provides the base bias for transistor $T_3$.

In view of the foregoing, it will be apparent that when the D.C. error or control voltage is applied to terminal J, a new operating frequency is automatically established. What is most important at this point is the fact that this new operating frequency is established without destroying the aforementioned stabilized characteristics, thus achieving desirable long term stability for internal variations of temperature and component tolerances, while yet still exhibiting a capability of rapid control of the oscillator's frequency by automatic, externally developed, D.C. control voltages. Note here that the capacitor $C_1$, and inductor $L_1$, which are connected in a regenerative feedback loop arrangement, do not adversely affect the response time of the oscillator, as is the case in oscillators utilizing narrow band selective networks. This desirable response time characteristic of the oscillator of the present invention is possible because of the wide bandwidth characteristics of the reactive network of the regenerative feedback loop.

Although the resistors $R_1$ through $R_6$ and resistor $R_8$ are shown as variable resistors for purposes of explaining the balanced operation of the oscillator of the present invention, fixed resistors are normally utilized, and the interdependence thereof must be established to provide this balanced operation, as will be discussed in detail below. Resistor $R_7$, however, is preferably variable so that the frequency tolerance of the oscillator can be internally controlled. The operation of the oscillator of FIG. 1 in light of the waveforms of FIG. 2 follows:

At time $t_0$, let it be assumed that the voltages at terminals A–E and H are as shown in waveforms 11 through 21, respectively, of FIG. 2. Also, let it be assumed that transistor $T_1$ is in its low conductivity state, and transistor $T_2$ is in its high conductivity state. Note here, that although transistor $T_1$ is in its low conductivity state, terminal A is above ground approximately 1.5 volts. This is due to the fact that the capacitor $C_1$ and inductor $L_1$ of the regenerative feedback loop causes the voltage on terminal A, during this time period, to follow the voltage on terminal D.

During the time interval $t_0$–$t_A$, transistor $T_1$, slowly approaches its high current conductivity state, thereby causing the voltage on terminal B to slowly decrease, as shown in waveform 13; whereas transistor $T_2$ slowly approaches its low current conductivity state, thereby causing the voltage at terminal D to slowly decrease, as shown in waveform 17. During this time interval, capacitor $C_1$ is discharging through resistor $R_1$, thereby causing the voltage at terminal A to slowly decrease, as shown in waveform 11. Note here that since the inductor $L_1$ is in the current path of capacitor $C_1$, and since inductor $L_1$ inherently opposes any change in current flow that it experiences, the voltage change on each of the terminals B and D, as well as terminals A and H, will be substantially sinusoidal, as shown in waveforms 13, 17, 11 and 21, respectively. Note also, that when the voltage on terminal B, i.e., the base of transistor $T_2$, falls below the voltage on terminal D, i.e., the emitter of transistor $T_2$, transistor $T_2$ will be reverse biased and will have reached its low current conductivity state. Of course, due to the cross-coupling circuitry associated with the transistors $T_1$ and $T_2$, transistor $T_1$ will be rapidly driven into its high conductivity state when $T_2$ reaches its low conductivity state (note waveform 13).

At time $t_A$, when the voltage on terminal B falls below the voltage on terminal D, transistor $T_2$ reaches its low conductivity state and the voltage on terminal D substantially levels off or "bottoms," as shown in waveform 17 of FIG. 2. At this same time, transistor $T_1$ is rapidly driven into its high conductivity state and reaches saturation, as shown in waveform 13 of FIG. 2. At this point in the operation of the oscillator of FIG. 1, the transistors $T_1$ and $T_2$ have substantially completed one "reversal" of their conductivity states.

During time intervals $t_A$–$t_B$, the inductor $L_1$ commences to charge. During this same time interval, due to the degenerative feedback loop between terminal E and the base of transistor $T_1$, the voltage on terminal E is coupled to the base of transistor $T_1$, and due to the regenerative feedback loop between terminals D and B, the voltage on terminal D follows the voltage on terminal A. When, however, the voltage on terminal A, i.e., the emitter of transistor $T_1$, exceeds the voltage on terminal E, i.e., the base of transistor $T_1$ (note waveforms 11 and 19), the transistor $T_1$ is reverse biased and the capacitor $C_1$ is now permitted to charge through resistor $R_1$. Note waveform 21 on terminal H, which is the junction of capacitor $C_1$ and inductor $L_1$. Although the voltage on terminal H is gradually rising during time interval $t_1$–$t_B$, this voltage change and corresponding change in current flow is opposed by inductor $L_1$, and such voltage change is not immediately coupled to terminal D. This is due to the fact that transistor $T_1$ is in a saturated current condition, and has no gain. Thus, no voltage change is coupled through the forward loop to the base of transistor $T_2$. However, once transistor $T_1$ returns to its normal operating state, i.e., no longer in saturation, the gain of transistor $T_1$ increases, thereby coupling a voltage change from terminal B to the base of transistor $T_2$.

Note at this point; that during time $t_1$, which is approximately midway between time interval $t_A$–$t_B$, the transistors $T_1$ and $T_2$ have completed a "reverse" of their conductivity states. Let it be assumed, therefore, that the time interval $t_0$–$t_1$ represents the first half cycle of operation of the oscillator of FIG. 1.

At time $t_B$, the inductor $L_1$ has charged to a voltage level whereby the voltage on terminal A, i.e. the emitter of transistor $T_1$, now exceeds the voltage on terminal E, i.e., the base of transistor $T_1$. This is so because transistor $T_2$ is attempting to increase conduction thereby causing the voltages on terminal D and E to increase. However, the voltage on terminal D is higher than the voltage on terminal E, and since the voltage on terminal A follows the voltage on terminal D, the voltage on the emitter of transistor $T_1$ exceeds the voltage on the base of transistor $T_1$, which is connected to terminal E. At this moment, transistor $T_1$ is reverse biased and current flow therethrough attempts to rapidly decrease. Note in waveform 13 that a sudden rise in voltage on terminal B does occur. However, due to the L–C time constant of inductor $L_1$ and capacitor $C_1$, and more particularly due to the opposition to current flow changes inherent in inductor $L_1$, the voltages on terminal A and B, as well as terminals D, E and H, gradually rise in a substantially sinusoidal waveform as shown in FIG. 2. Thus, at time $t_B$, the transistor $T_1$ commences to slowly approach its low conductivity state, whereas transistor $T_2$ commences to slowly approach its high conductivity state.

During the time interval $t_B$–$t_2$, capacitor $C_1$ is still charging through resistor $R_1$ and transistor $T_1$ gradually approaches its low conductivity state, whereas transistor $T_2$ gradually approaches its high conductivity state.

At time $t_2$, the voltage on terminal E, i.e., the base of transistor $T_1$ exceeds the voltage on terminal A, i.e., the emitter of transistor $T_1$. At this time period, transistor $T_1$ is forward biased and commences to slowly conduct, thereby causing the potential at terminal B to slowly decrease. Of course, due to the cross coupling circuitry of the oscillator of FIG. 1, current flow through transistor $T_2$ slowly decreases, thus causing the voltages on terminals D and E to slowly decrease. Note at this point that the current conduction of transistor $T_2$ never reaches saturation and the voltages on terminals A–E never level off or "bottom" as was the case during time interval $t_0$–$t_1$. This is due to the fact that the transistors $R_3$ to $R_5$, which are in the emitter-collector circuit of transistor $T_2$, cause the voltage at terminal E to exceed the voltage at terminal A before the transistor $T_2$ can reach saturation. This unbalance of transistor circuitry is necessary for the oscillator to operate as a free-running frequency generator.

Let it be assumed now, that the time period $t_1$–$t_2$ constitutes the second half cycle of operation of the oscillator of FIG. 1. Thus, the time period $t_0$–$t_2$ represents one full cycle of operation of the present oscillator.

During the time intervals $t_2$–$t_C$, $t_C$–$t_D$ and $t_D$–$t_4$, the oscillator of FIG. 1 operates in the same manner as above described with regard to time intervals $t_0$–$t_A$, $t_A$–$t_B$ and $t_B$–$t_2$, respectively, thus, time interval $t_2$–$t_4$ represents a second complete cycle of operation of the present invention.

For exemplary purposes only, the following values for the components of the circuit of FIG. 1 are included as follows:

| | |
|---|---|
| $T_1$, $T_2$ and $T_3$ | 2N697A |
| $C_1$ ______ microfarads__ | .043 |
| $C_2$ ______ do____ | .01 |
| $C_3$ ______ do____ | 50 |
| $L_1$ ______ millihenries__ | 8.6 |
| $R_1$ ______ ohms__ | 237 |
| $R_2$ ______ kilohms__ | 5.6 |
| $R_3$ ______ ohms__ | 619 |
| $R_4$ ______ do____ | 75 |
| $R_5$ ______ do____ | 237 |
| $R_6$ ______ kilohms | 3.9 |
| $R_7$ ______ do____ | 5 |
| $R_8$ ______ do____ | 46 |

It is interesting to note here that the oscillator of the present invention is uniquely stable even to the extent of being substantially frequency insensitive to large change in transistor parameters. For example, when highly accurate and stable transistors with a beta of 150 at 10 milliamps were replaced by considerably less accurate and unstable transistors with a beta of 30 at 10 milliamps the oscillator experienced a frequency change of merely ±5 cycles when the oscillator was operating at approximately 10 kc. center frequency. Next, Dry Ice was placed on an oscillator using beta transistors, and on an oscillator using high beta transistors, and the oscillators experienced a frequency change of merely ±2 cycles at a 10 kc. center frequency. Finally, a soldering iron was placed on an oscillator using low beta transistors, and on an oscillator using high beta transistors, and in both cases the oscillators experienced a frequency change of merely ±4 cycles at a 10 kc. center frequency.

The terms and expressions which have been employed herein are used as terms of descriptions and not of limitation and it is not intended, in the use of such terms and expressions, to exclude any equivalents of the features shown and described, or portions thereof, but it is recognized that various modifications are possible within the scope of the present invention.

Without further elaboration, on the foregoing is considered to explain the character of the present invention so that others may, be applying current knowledge, readily adapt the same for use under varying conditions of service while still retaining certain features which may properly be said to constitute the essential items of novelty involved, which items are intended to be defined and secured by the appended claims.

We claim:

1. An oscillator for generating a stable, low frequency, substantially sinusoidal wave comprising, in combination:

(a) first and second active means, each including electron emitting, collecting and control means;

(b) means for coupling the collecting means of said first active means to the control means of said second active means in a forward loop manner;

(c) means for coupling the emitting means of said second active means to the control means of said first active means in a degenerative manner;

(d) reactive means for coupling together said emitting means of said first and second active means in a regenerative manner, whereby said reactive means establishes the repetition rate of said oscillator;

(e) external control voltage; and (f) third active means for coupling said external control voltage to said reactive means thereby automatically adjusting the operating frequency of said oscillator.

2. An oscillator in accordance with claim 1 wherein:

(a) said active means are solid state devices; and (b) said reactive means are series connected capacitance and inductance.

3. A free running oscillator for generating a stable, low frequency, substantially sinusoidal wave comprising, in combination:

(a) first and second active means, each including electron emitting, collecting and control means;

(b) a source of potential;

(c) resistive means for respectively coupling the collecting means of each of said active means to said source of potential;

(d) resistive means for respectively coupling the emitting means of each of said active means to ground;

(e) DC means for coupling the collecting means of said first active means to the control means of said second active means in a forward loop circuit arrangement;

(f) DC means for coupling the emitting means of said second active means to the control means of said first active means in a degenerative circuit arrangement;

(g) reactive means for coupling together said emitting means of said first and second active means in a regenerative circuit arrangement, whereby said reactive means establishes the frequency of said oscillator;

(h) external control voltage; and (i) an impedance matching solid state device for coupling said external control voltage to the said reactive means thereby automatically adjusting the operating frequency of said oscillator.

4. An oscillator in accordance with claim 3, wherein:

(a) said active means are solid state devices having emitter, collector and control electrodes;

(b) said resistive means are resistors; and (c) said reactive means are series connected capacitance and inductance.

5. An oscillator in accordance with claim 4 wherein:

(a) said impedance matching solid state device includes a variable resistor for internally controlling the frequency tolerance of said oscillator.

6. A free running oscillator for generating a stable, low frequency, substantially sinusoidal wave comprising, in combination:

(a) first and second active devices, each including current emitting, current collecting and current control means;
(b) a D.C. source of potential;
(c) said collecting means of each of said active devices being connected to said D.C. source of potential through respective first and second resistive means;
(d) said emitting means of said first active device being connected to ground through a third resistive means;
(e) said emitting means of said second active device being connected to ground through a fourth and fifth series connected resistive means;
(f) said control means of said first active device being connected to the junction of said fourth and fifth resistive means so as to provide a degenerative feedback loop;
(g) said control means of said second active device being connected to said collecting means of said first active device so as to provide a forward loop;
(h) reactive means coupled between said emitting means of said first and second active devices so as to provide a regenerative feedback loop, whereby said reactive means establishes the frequency of oscillator;
(i) an emitter follower having emitter, collector, and control means, said collector means connected to said D.C. source of potential;
(j) an external D.C. control voltage coupled to the control means of said emitter follower;

(k) resistive means series connected in the emitter means of said emitter follower thereby providing the output load means for said emitter follower; and
(l) A.C. coupling means for coupling the A.C. components of said D.C. control voltage, which are developed across said output load means, to said reactive means so as to automatically vary the reactive time constant of said reactive means in a linearly proportional manner with respect to said D.C. control voltage, thereby automatically establishing the operating frequency of said oscillator.

7. An oscillator in accordance with claim 6 wherein:
(a) said active devices are transistors having emitter, collector and control electrodes;
(b) said resistive means are resistors; and
(c) said reactive means are a series connected capacitance and inductance.

8. An oscillator in accordance with claim 7 wherein:
(a) said resistive means which are series connected in the emitter circuit of said emitter follower, are variable for internally controlling the frequency tolerance of said oscillator.

No references cited.

ROY LAKE, *Primary Examiner.*

S. H. GRIMM, *Assistant Examiner.*